(12) United States Patent
Bermudez Onopa (10) Patent No.: US 12,291,329 B2
(45) Date of Patent: May 6, 2025

(54) INTEGRATED THRUST-LIFT WING

(71) Applicant: Ramon David Bermudez Onopa, Debary, FL (US)

(72) Inventor: Ramon David Bermudez Onopa, Debary, FL (US)

(\*) Notice: Subject to any disclaimer, the term of this patent is extended or adjusted under 35 U.S.C. 154(b) by 74 days.

(21) Appl. No.: 18/144,028

(22) Filed: May 5, 2023

(65) Prior Publication Data

US 2024/0116623 A1  Apr. 11, 2024

Related U.S. Application Data

(60) Provisional application No. 63/338,869, filed on May 5, 2022.

(51) Int. Cl.
| | | |
|---|---|---|
| *B64C 3/14* | (2006.01) | |
| *B64C 13/26* | (2006.01) | |
| *B64C 27/473* | (2006.01) | |
| *B64D 35/021* | (2024.01) | |

(52) U.S. Cl.
CPC ............... *B64C 3/14* (2013.01); *B64C 13/26* (2013.01); *B64C 27/473* (2013.01); *B64D 35/021* (2024.01)

(58) Field of Classification Search
CPC ......... B64C 3/14; B64C 13/26; B64C 27/473; B64C 3/32; B64C 11/001; B64C 2003/143; B64C 2230/04; B64D 35/021; B64D 27/31; B64D 35/04; B64U 30/295
See application file for complete search history.

(56) References Cited

U.S. PATENT DOCUMENTS

| | | | |
|---|---|---|---|
| 11,072,423 B1 * | 7/2021 | Robertson | ............... B64C 27/78 |
| 2018/0186449 A1 * | 7/2018 | Jiang | ................... B64C 29/0025 |
| 2018/0237136 A1 * | 8/2018 | Choi | .................... B64C 29/0033 |

FOREIGN PATENT DOCUMENTS

| | | | | |
|---|---|---|---|---|
| AU | 2014271960 A1 * | 12/2015 | ............ | F03B 17/065 |
| CN | 110239710 A * | 9/2019 | | |
| ES | 2442390 A9 * | 12/2014 | ............ | B64C 15/12 |
| JP | 2001050001 A * | 2/2001 | | |

\* cited by examiner

*Primary Examiner* — Assres H Woldemaryam
(74) *Attorney, Agent, or Firm* — Lowndes (57) ABSTRACT

The novel wing design disclosed herein has a cambered, swept wing design for aircraft application that can achieve steady state flight via the integration of an electric motor driven lift-thrust system that can provide both vertical thrust for take-off and horizontal thrust for flight propulsion by the selective use of fan blades connected to the motor.

20 Claims, 9 Drawing Sheets

INTEGRATED THRUST-LIFT WING

CROSS-REFERENCE TO RELATED APPLICATIONS

This application claims priority to U.S. Provisional Patent Application Ser. No. 63/338,869, filed May 5, 2022.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM

Not applicable.

STATEMENT REGARDING PRIOR DISCLOSURES BY THE INVENTOR OR A JOINT INVENTOR

Not applicable.

BACKGROUND OF THE INVENTION

Field of Invention

The present disclosure generally relates to aircraft wings and more particularly to aircraft wings with integrated motors to enhance lift.

Description of Related Art

Lift created by an airfoil is the result of differing pressures over the surface of the airfoil. In general, a decreased pressure on the top surface of the airfoil coupled with an increased pressure on the bottom surface of the airfoil generate the lift necessary for flight. In a traditional wing design the differential pressure is created by airflow over a cambered surface resulting from the forward movement of the airfoil through the air by way of a means of propulsion, such as, for example, an engine driven propeller or turbine.

Improvements in the short take-off and landing characteristics of aircraft came by way of larger surfaced airfoils, such as those seen in light sport aircraft, directional thrust vectoring, such as that seen in a Harrier jet, and directional propellers, such as those seen vertical take-off and landing aircraft.

The invention disclosed herein uses a combination of axial fan blades and centrifugal fan blades on a single drive shaft to selectively generate lift thrust and forward thrust for flight.

Any documents or publications cited in this disclosure are incorporated by reference in their entirety, to the extent they are not inconsistent with the explicit teachings set forth herein.

BRIEF SUMMARY OF THE INVENTION

The wing design includes an airfoil having a root for connecting to an aircraft surface. The airfoil further includes a tip opposite the root, a leading edge, and a trailing edge. A thrust-lift system can be disposed in the wing adjacent to, and outboard of, the root. The thrust-lift system can include a motor having a drive shaft, wherein the drive shaft is connected to a first clutch connected to a first control hub, further connected to a set of axial fan blades. The drive shaft can further be connected to a second clutch connected to a second hub connected to centrifugal fan blades.

The thrust-lift system can further be enclosed in a housing having a top port, a bottom port, and an exhaust port. When engaged, the axial fan blades draw air through the top port and directs it through the wing through the bottom port generating lift. The axial fan blades may be variable pitched with pitch being controlled by the first control hub. The centrifugal fan blades, when engaged, draw air through the top port and directs it into the exhaust port wherein the exhaust port further includes an internal control surface for directing exhaust air created by the centrifugal fan blades. The axial fan blades provide vertical lift and the centrifugal blades create exhaust air for horizontal thrust.

A control unit can be connected to the motor, first clutch, second clutch, control hub, and internal control surface to selectively operate the motor, first clutch, second clutch, control hub, and internal control surface.

Accordingly, it is an object of the present invention to provide a wing design incorporating a combination of axial fan blades and centrifugal fan blades on a single drive shaft to selectively generate lift thrust and forward thrust for flight, although multiple drive shafts remain an option.

It is a further object of the present invention to provide a wing design of claim wherein the airfoil is cambered and includes any combination of ailerons, flaps, vortex generators, winglets, lighting, stall warning indicators, antennae, electronics, batteries, pitot-static components, or fuel system components.

It is an even further object of the present invention to provide a wing design wherein the motor is electric, however, petrol driven engines or motors are optional.

It is an even further object of the present invention to provide a wing design wherein the wing is attached to the aircraft fuselage or empennage, or both.

Further objects and advantages of the present invention will become apparent by reference to the following detailed disclosure of the invention and appended drawings wherein like reference numerals refer to the same feature, component or element.

DETAILED DISCLOSURE OF THE INVENTION

Referring first to the FIGS. 1-4, the wing design is disclosed herein is shown and illustrated by reference numeral 10. The drawing shows a dashed-line C being included solely for reference to distinguish the left wing from the right wing. Reference letters T and S enclosed in the arrows are included to indicate the direction of thrust and suction, respectively.

The wing 10 includes an airfoil 20 having a root 22 for connecting to an aircraft surface (not shown). The airfoil 20 can be in a monoplane (not shown), low wing (not shown), mid wing (not shown), shoulder wing (not shown), high wing (not shown), or parasol wing (not shown) configuration. A swept wing airfoil 20 configuration is illustrated, however, the wing may be in any configuration, such as, for example, forward swept (not shown), constant chord (not shown), tapered (not shown), elliptical (not shown), circular (not shown), annular (not shown), delta (not shown), or any other configuration known in the art.

The airfoil 20 further includes a tip 24 opposite the root 22, a leading edge 26, and a trailing edge 28. A thrust-lift system 30 is generally disposed in the airfoil 20 adjacent to, and outboard of, the root 22. The thrust-lift system 30 can include a motor 40 having a drive shaft 41, wherein the drive shaft 41 is connected to a first clutch 42 connected to a first control hub 43, further connected to a set of axial fan blades 44. The drive shaft 41 is further connected to a second clutch 45 connected to a second hub 46 connected to centrifugal fan blades 47.

The thrust-lift system 30 can further be enclosed in a housing 31 having a top port 32, a bottom port 33, and an exhaust port 34. When engaged, the axial fan blades 44 draw air through the top port 32 and directs it through the airfoil 20 through the bottom port 33 generating lift. The axial fan blades 44 may be variable pitched with pitch being controlled by the first control hub 43. The pitch of the axial fan blades can be controlled by pitch controller (not shown), such as, for example a governor, a constant speed unit, or other pith controller as may be known in the art.

Figure 1:
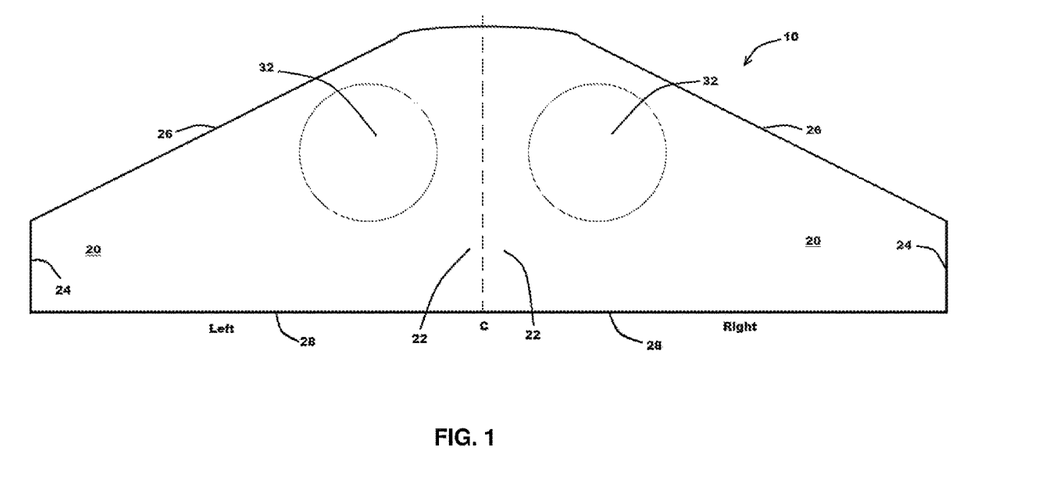
FIG. 1 is a top external view of the wing design according to aspects of the present invention.
Figure 2:
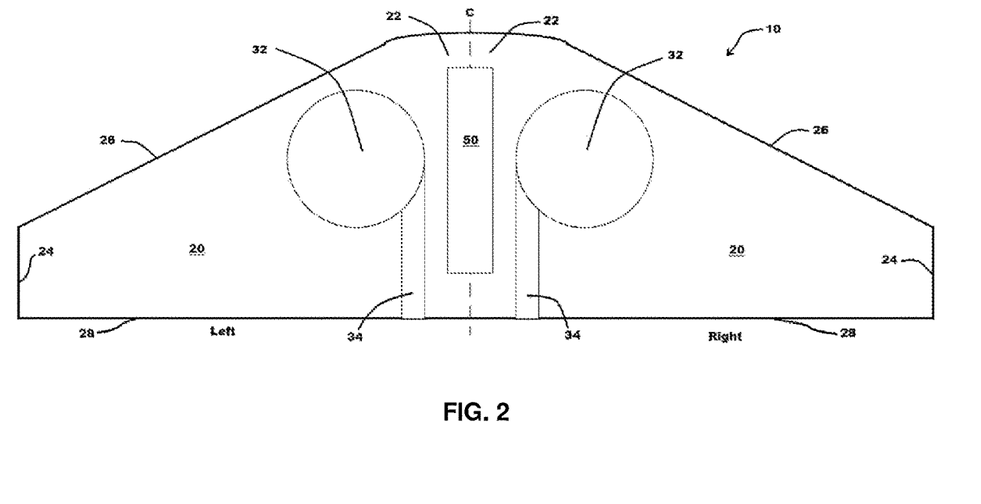
FIG. 2 is a top internal view of the wing design according to aspects of the present invention.
Figure 3A:
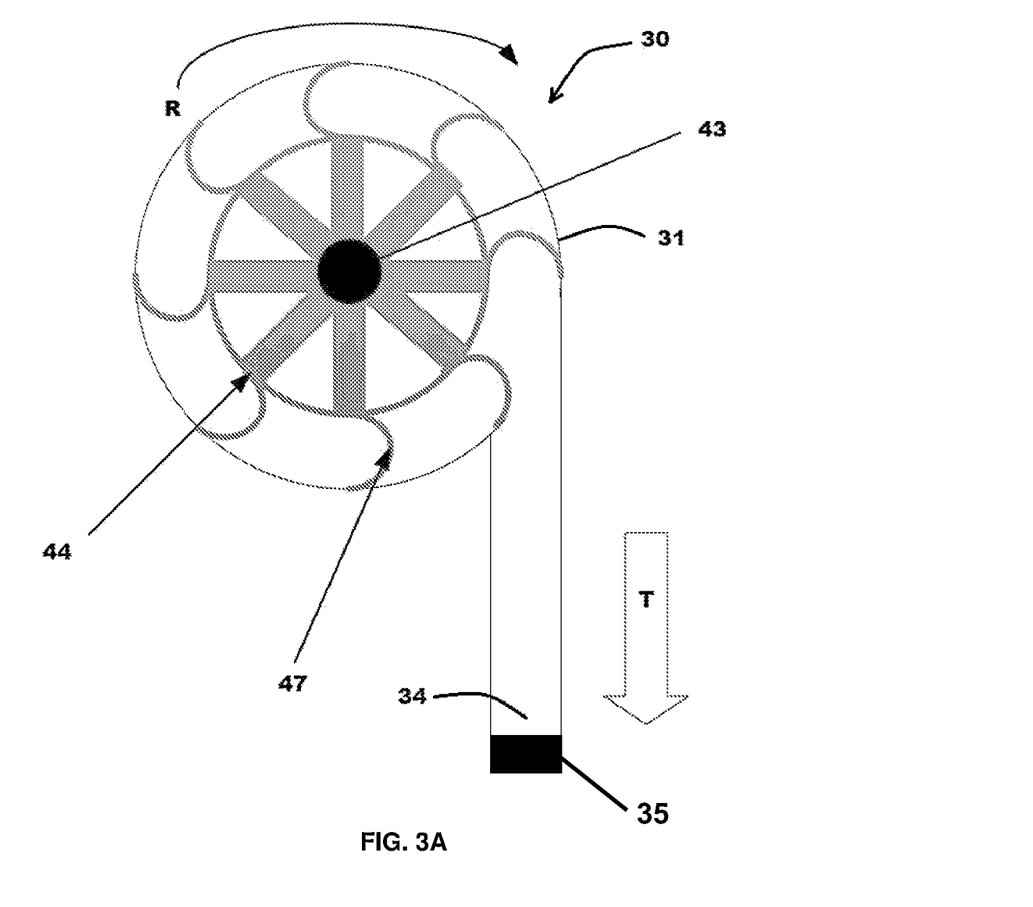
FIG. 3A is a top internal view of the left-side lift-thrust system according to aspects of the present invention.
Figure 3B:
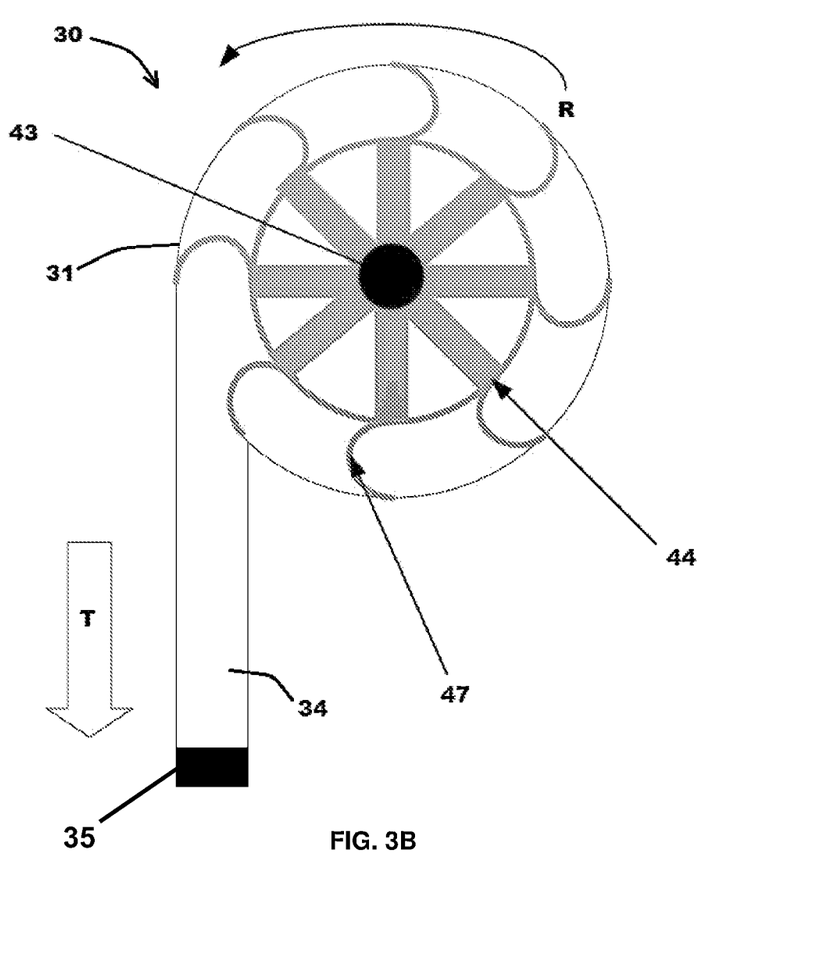
FIG. 3B is a top internal view of the right-side lift-thrust system according to aspects of the present invention.
Figure 4A:
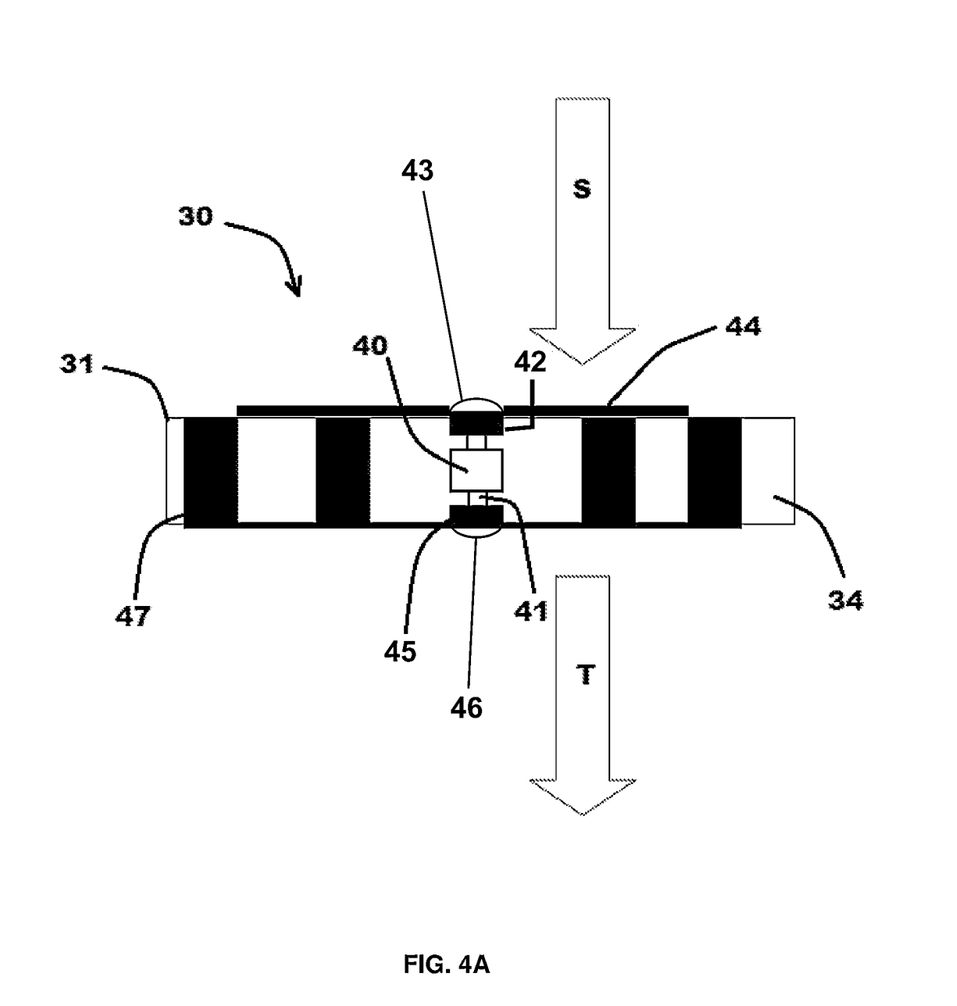
FIG. 4A is a rear internal view of the left-side lift-thrust system according to aspects of the present invention.
Figure 4B:
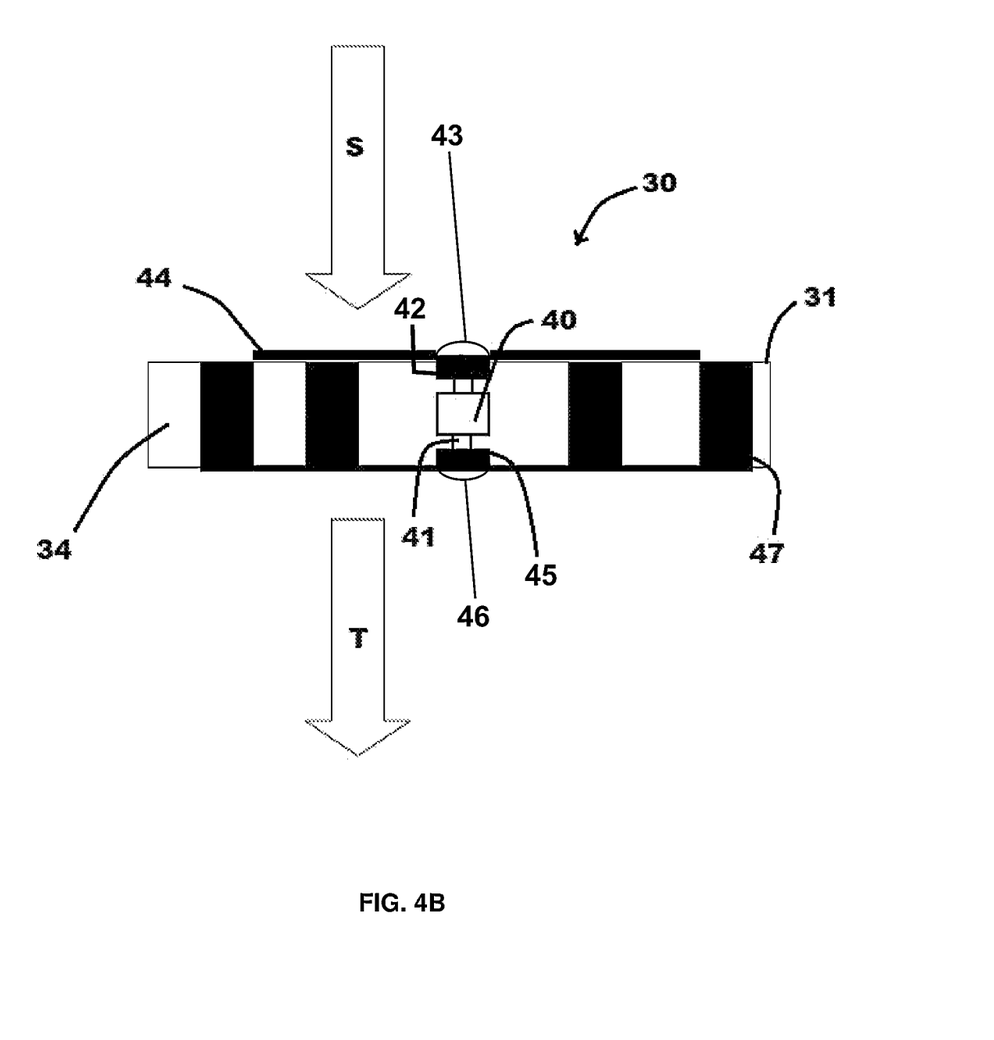
FIG. 4B is a rear internal view of the right-side lift-thrust system according to aspects of the present invention.
Figure 5:
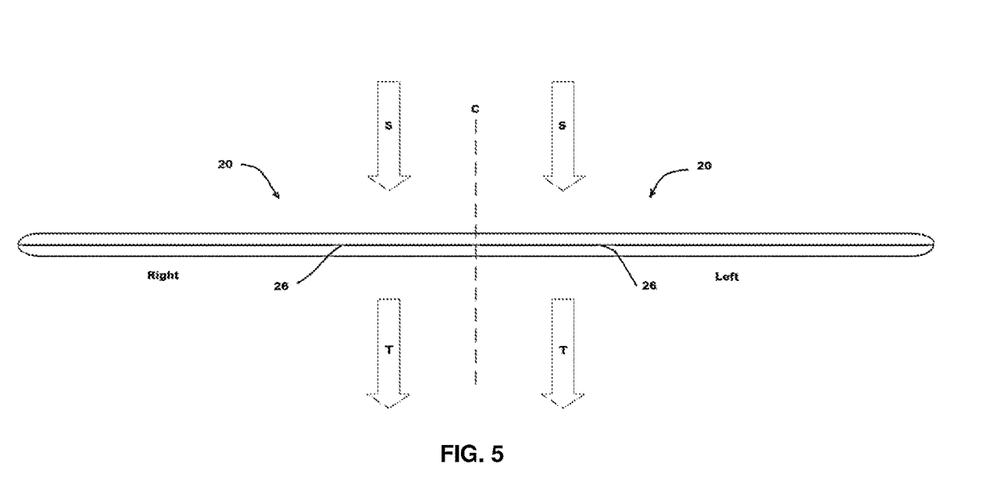
FIG. 5 is a plan view of the leading edge of the wing design according to aspects of the present invention.
Figure 6:
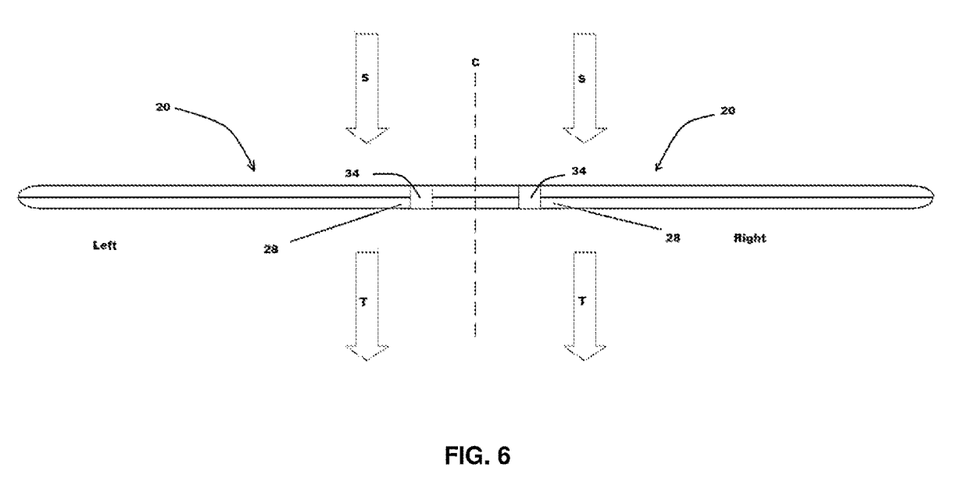
FIG. 6 is a plan view of the trailing edge of the wing design according to aspects of the present invention.
Figure 7:
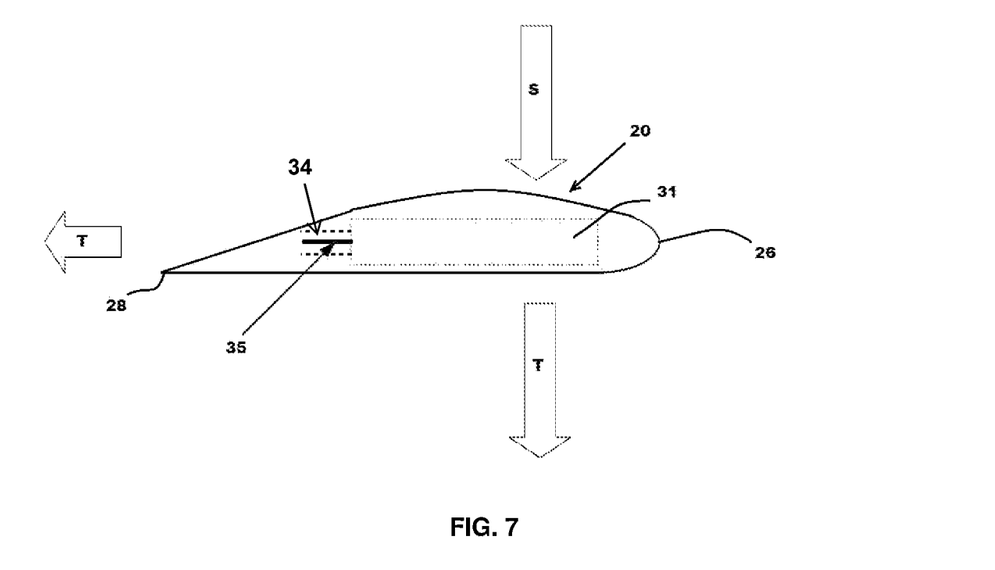
FIG. 7 is a plan view of a cross-cut of the wing design according to aspects of the present invention.

Specifically referring to FIGS. 3A and 3B, the direction of rotation of the centrifugal fan blades is shown by reference letter R. FIG. 3A represents the thrust-lift system 30 of the left airfoil FIG. 3B represents the thrust-lift system 30 of the right airfoil.

The centrifugal fan blades 47, when engaged, draw air through the top port 32 and can direct it into the exhaust port 34 wherein the exhaust port 34 further includes an internal control surface 35 for directing exhaust air created by the centrifugal fan blades 47. The axial fan blades 44 provide vertical lift and the centrifugal blades 47 create exhaust air for horizontal thrust.

A control unit 50 can be connected to the motor 40, first clutch 42, second clutch 45, first control hub 43, and internal control surface 35 to selectively operate the motor 40, first clutch 42, second clutch 45, first control hub 43, and internal control surface 35. The control unit 50 can include electronics (not shown) for control and batteries (not shown) for power. Integrated into the control unit can be an inertial navigation system (not shown) and/or gyroscopic instrumentation and controls (not shown) to maintain the stability of the aircraft during flight.

The wing 10 incorporates a combination of axial fan blades 44 and centrifugal fan blades 47 on a single drive shaft 41 to selectively generate lift thrust and forward thrust for flight, although multiple drive shafts (not shown) remain an option.

Alternative embodiments include a wing design wherein the airfoil 20 is cambered and includes any combination of ailerons (not shown), elevators (not shown), flaps (not shown), cuffs (not shown), slats (not shown), air-brakes (not shown), fairings (not shown), fences (not shown), vortex generators (not shown), lighting (not shown), stall warning indicators (not shown), antennae (not shown), electronics (not shown), batteries (not shown), pitot-static components (not shown), or fuel system components (not shown).

Further alternative embodiments include a wing design wherein the motor is electric; however, petrol driven engines or motors are also feasible. The motor can be constant speed or variable speed.

Following are examples illustrating procedures for practicing the invention. These examples should be construed to include obvious variations and not limiting.

Example 1

The wing 10 disclosed herein has a cambered, swept wing design for aircraft application that can achieve steady state flight via the integration of an electric motor 40 lift-thrust system 30 that can provide both vertical thrust for take-off and horizontal thrust for flight propulsion.

The structural design of the wing 10 disclosed herein consists of a forward swept airfoil 20 with a cambered profile and integrated electric motor 40 lift-thrust system 30 as illustrated in the attached FIGS. 1 through 7.

Lift and thrust are supplied via an internal lift-thrust system 30 consisting of: 1) a variable speed electric motor 40; 2) a battery pack (not shown); 3) a control unit 50; 4) variable pitch axial fan blades 44 connected to the motor 40 via first control hub 43 further connected to a first clutch mechanism 42 further connected to a drive shaft 41 at the top of the motor 40; 5) centrifugal fan blades 47 are connected to the motor 40 via second control hub 46 further connected to a second clutch mechanism 45 further connected to a drive shaft 41 at the bottom of the motor 40; 6) a housing 31 for the centrifugal fan blades 47 with an exhaust port 34; and 7) a control surface 35 at the end of the exhaust nozzle to vary the propulsion vector.

With the wing 10 operation, the top port 32 and bottom port 33 allow the axial fan blades 44 suck air from the above the airfoil 20 and thrust it downward for vertical take-off and landing (VTOL). The centrifugal fan blades 47 engage on the same motor 40 as the axial fan blades 44 and move air centrifugally withing the housing 31 and out through the exhaust port 34. Specifically, the centrifugal fan blades 47 draw air from above the airfoil 20 through the top port 32 and forces the air backward through the exhaust port 34 to create thrust for propulsion.

In order to operate with only one motor 40, a first clutch 42 and second clutch 45, each disposed on different sides of the motor 40, is each used to transfer power to both the axial fan blades 44 and centrifugal fan blades 47, through their respective hubs 43, 46.

During take-off, all power can be transferred to the axial fan blades 44 for vertical thrust. Once the aircraft is airborne, power can be gradually transferred to the centrifugal fan blades 47 for propulsion. As the aircraft moves forward, the cambered airfoil 20 begins to generate lift, full power can be transferred to the centrifugal fan blades 47. Similarly, the reverse process would occur to land the aircraft by gradually transferring power from the centrifugal fan blades 47 to axial fan blades 44 for a smooth vertical landing.

The wing 10 functions by:
a. Air flowing around cambered, forward swept airfoil 20 profile;
b. Air being drawn from above the airfoil 20 surface via the top port 32 of the thrust-lift system 30;
c. Air being expelled through the bottom port 33 of the thrust-lift system 30 to generate vertical thrust for vertical take-off and landing (VTOL);
d. Vertical thrust being controlled by the variable speed motor 40;
e. Air being expelled through the rear of airfoil 20 via exhaust port 34 of the lift-thrust system 30 to generate horizontal thrust and provide propulsion to the aircraft;
f. Horizontal thrust is varied by the variable speed electric motor 40 and/or control surface 35 in exhaust port 34;
g. Once moving forward, the airflow around the cambered airfoil 20 provides the lift for the aircraft and the power of the motor 40 can be selectively used for propulsion;
h. Roll, pitch and yaw movement can be controlled by individual operation of each lift-thrust system 30 or controlled by traditional flight surfaces on the airfoil 20.

Some of the benefits compared to Quadcopters and Predator drones may include:
a. Safety—The lift-thrust system 30 is embedded within the airfoil 20 structure and therefore protected from interference with external elements.
b. Stealth—The lift-thrust system 30 is embedded within the airfoil 20 profile and therefore can be designed for stealth characteristics.
c. Range—The cambered airfoil 20 provides lift while in flight so the range can be extended in comparison to current VTOL designs where the majority of the power is expended in vertical thrust to maintain the aircraft in the air.

Inasmuch as the preceding disclosure presents the best mode devised by the invention for practicing the invention and is intended to enable one skilled in the pertinent art to carry it out, it is apparent that methods incorporating modifications and variations will be obvious to those skilled in the art. As such, it should not be construed to be limited thereby but should include such aforementioned obvious variations and be limited only by the spirit and scope of the following claims.

I claim:

1. An integrated thrust-lift system comprising:
a wing having a root for connecting to an aircraft surface, a tip opposite the root, a leading edge, and a trailing edge;
a thrust-lift system disposed in said wing adjacent to and outboard of the root, wherein the thrust-lift system comprises a motor having a drive shaft, wherein the drive shaft is connected to a first clutch connected to a first control hub, further connected to a set of axial fan blades, and wherein the drive shaft is further connected to a second clutch connected to a second hub connected to centrifugal fan blades, wherein the thrust-lift system is further enclosed in a housing having a top port, a bottom port, and an exhaust port, wherein the axial fan blades draw air through the top port and directs it through the wing through the bottom port generating lift, wherein the centrifugal fan blades draw air through the top port and directs it into the exhaust port wherein the exhaust port further comprises an internal control surface for directing exhaust air created by the centrifugal fan blades, wherein the axial fan blades provide vertical lift and the centrifugal blades create exhaust air for horizontal thrust; and
a control unit connected to the motor, first clutch, second clutch, first control hub, and internal control surface to selectively operate the motor, first clutch, second clutch, first control hub, and internal control surface.

2. The integrated thrust-lift system of claim 1, wherein said wing is cambered.

3. The integrated thrust-lift system of claim 1, wherein the motor is electric.

4. The integrated thrust-lift system of claim 1, wherein said wing further comprises ailerons.

5. The integrated thrust-lift system of claim 4, wherein the control unit is further connected to, and controls, the ailerons.

6. The integrated thrust-lift system of claim 5, wherein the wing further comprises flaps.

7. The integrated thrust-lift system of claim 6, wherein the control unit is further connected to, and controls, the flaps.

8. The integrated thrust-lift system of claim 1, wherein the axial fan blades are variable pitched axial fan blades.

9. The integrated thrust-lift system of claim 1, wherein the aircraft surface is a fuselage.

10. The integrated thrust-lift system of claim 1, wherein the aircraft surface is an empennage.

11. An integrated thrust-lift system comprising:
a cambered wing having a root for connecting to an aircraft surface, a tip opposite the root, a leading edge, and a trailing edge;
a thrust-lift system disposed in said wing adjacent to and outboard of the root, wherein the thrust-lift system comprises an electric motor having a drive shaft, wherein the drive shaft is connected to a first clutch connected to a first control hub, further connected to a set of axial fan blades, and wherein the drive shaft is further connected to a second clutch connected to a second hub connected to centrifugal fan blades, wherein the thrust-lift system is further enclosed in a housing having a top port, a bottom port, and an exhaust port, wherein the axial fan blades draw air through the top port and directs it through the wing through the bottom port generating lift, wherein the centrifugal fan blades draw air through the top port and directs it into the exhaust port wherein the exhaust port further comprises an internal control surface for directing exhaust air created by the centrifugal fan blades, wherein the axial fan blades provide vertical lift and the centrifugal blades create exhaust air for horizontal thrust; and
a control unit connected to the motor, first clutch, second clutch, and internal control surface to selectively operate the motor, first clutch, second clutch, and internal control surface.

12. The integrated thrust-lift system of claim 11, wherein said wing further comprises ailerons.

13. The integrated thrust-lift system of claim 12, wherein the control unit is further connected to, and controls, the ailerons.

14. The integrated thrust-lift system of claim 13, wherein the wing further comprises flaps.

15. The integrated thrust-lift system of claim 14, wherein the control unit is further connected to, and controls, the flaps.

16. The integrated thrust-lift system of claim 11, wherein the axial fan blades are variable pitched axial fan blades.

17. The integrated thrust-lift system of claim 11, wherein the aircraft surface is a fuselage.

18. The integrated thrust-lift system of claim 11, wherein the aircraft surface is an empennage.

19. An integrated thrust-lift system comprising:
- a cambered wing having a root for connecting to an aircraft surface, a tip opposite the root, a leading edge, and a trailing edge;
- a thrust-lift system disposed in said wing adjacent to and outboard of the root, wherein the thrust-lift system comprises an electric motor having a drive shaft, wherein the drive shaft is connected to a first clutch connected to a first control hub, further connected to a set of variable-pitch axial fan blades, and wherein the drive shaft is further connected to a second clutch connected to hub connected to centrifugal fan blades, wherein the thrust-lift system is further enclosed in a housing having a top port, a bottom port, and an exhaust port, wherein the variable-pitch axial fan blades draw air through the top port and directs it through the wing through the bottom port generating lift, wherein the centrifugal fan blades draw air through the top port and directs it into the exhaust port wherein the exhaust port further comprises an internal control surface for directing exhaust air created by the centrifugal fan blades, wherein the variable-pitch axial fan blades provide vertical lift and the centrifugal blades create exhaust air for horizontal thrust; and
- a control unit connected to the motor, first clutch, second clutch, first control hub, and internal control surface to selectively operate the motor, first clutch, second clutch, first control hub, and internal control surface.

20. The integrated thrust-lift system of claim 19, wherein the aircraft surface is a fuselage.

* * * * *